(No Model.)

A. G. MAY.
THILL COUPLING BOLT.

No. 603,196. Patented Apr. 26, 1898.

Witnesses
L. D. Heinrichs
Victor J. Evans

Inventor
August G. May
by John Wedderburn
Attorney

UNITED STATES PATENT OFFICE.

AUGUST G. MAY, OF ST. CHARLES, MISSOURI.

THILL COUPLING-BOLT.

SPECIFICATION forming part of Letters Patent No. 603,196, dated April 26, 1898.

Application filed June 9, 1897. Serial No. 640,042. (No model.)

*To all whom it may concern:*

Be it known that I, AUGUST G. MAY, of St. Charles, in the county of St. Charles and State of Missouri, have invented certain new and useful Improvements in Coupling-Bolts; and I do hereby declare the following to be a full, clear, and exact description of the invention, such as will enable others skilled in the art to which it appertains to make and use the same.

The invention relates to a coupling pin or bolt for connecting thill or pole irons to the axle-clips of vehicles and other like purposes, the object being to provide a coupling-pin which is not liable to accidental displacement, but which can be readily removed when it is desired to uncouple the parts connected thereby and as readily replaced for reuniting said parts.

It consists in the combination, with a coupling pin or bolt, of a spring secured at one end to the head of the pin and at the other end to means engaging the end of the pin or bolt for holding the same in place, the spring in use striding the parts connected by the pin or bolt.

It will be understood from the following description and claims, reference being had to the accompanying drawings, in which—

Figure 1:
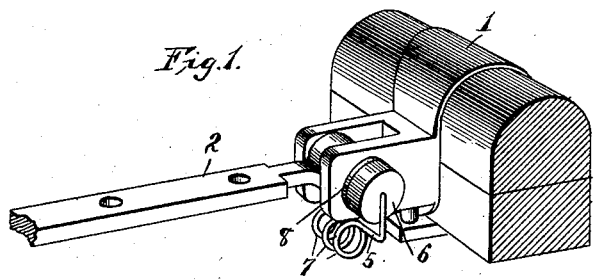
Figure 2:
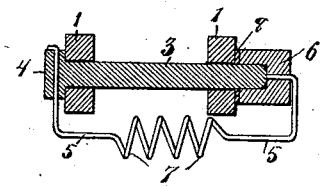
Figure 3:
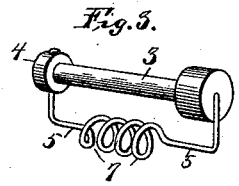
Figure 4:
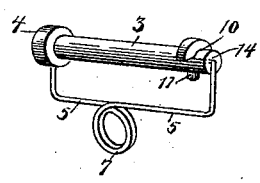
Figure 5:

Figure 1 is a perspective view of a thill-coupling and the pin or bolt connecting the same with an axle-clip; Fig. 2, a transverse section through the pin and its spring in front elevation. Fig. 3 is a perspective view of the coupling-pin and its spring and fastening devices. Fig. 4 is a perspective view showing a modification in the pin-fastening devices; and Fig. 5 is a transverse section through the end of the pin shown in Fig. 4, showing the key in said end in plan view.

1 indicates in the present instance an axle-clip, and 2 a thill-iron connected therewith, the parallel ears of the clip and the rear end of the thill-iron engaging or interposed between said ears being perforated to receive a pin or bolt 3, provided at one end with a head 4.

5 indicates a spring secured at one end to the head end of the pin or bolt and provided at its opposite end with a cup or thimble 6, having at its inner end a cylindrical bore adapted to fit snugly over the end of the pin.

The spring is provided intermediate its ends with a series of coils at 7, the arrangement of which is such as to cause the spring by its tension to hold the cup or thimble 6 securely over the end of the bolt or pin.

8 indicates a washer interposed between the open end of the cup or thimble and the axle-clip or other device to which the coupling-pin is applied, said washer being made preferably of rubber and of suitable thickness to cause it to be held snugly between the thimble and the face of the clip, said washer serving thereby to exclude moisture from the thimble and so prevent rust. The thimble may serve also as a lubricating-cup for containing oil for lubricating the pin to prevent rust. The spring should be of sufficient strength to hold the thimble firmly over the end of the pin at all times and to hold the head of the pin snugly down upon the opposing face of the clip, so that accidental displacement of the pin is effectually guarded against, the thimble being removable for removing the pin only by the action of the hand in an effort to apply or remove the coupling-pin.

In Figs. 4 and 5 in lieu of the cup the end of the pin is perforated at 9 and is also recessed at 10 upon one side to adapt it to receive a key 11, having a head 12, which enters the recess and prevents the key from being turned in the perforation for its reception. This key is provided with a vertical perforation 13 through its pin portion, and the end of the pin is provided with a longitudinal bore coinciding with the perforation through the pin portion of the key. In this construction the end of the spring engaging the pin is recurved, so that its end (indicated at 14) is in a plane parallel with the body of the spring, said end 14 being adapted to enter the perforation in the pin and to pass through the perforation in the key-pin, as indicated, thereby effectually preventing accidental displacement of the key and holding the coupling-pin securely in engagement with the parts connected thereby, it being necessary to disconnect the spring from the key before the latter can be removed for removing the coupling-pin.

Where a bolt is employed with a screw-threaded end and a nut for holding said bolt in place, the end of the spring at the threaded end of the bolt may be made to engage the nut for preventing the accidental displacement of the nut. The cup or thimble, which represents the preferred form of construction for securing the upright bolt in place, can be readily cast from any suitable metal, and, in connection with the spring, which is formed from a single piece of annealed wire of suitable strength, will be of less expense to manufacture than the usual construction of threaded bolt and nut employed for the purpose of uniting the parts, as described.

Having thus described the invention, what I claim as new, and desire to secure by Letters Patent, is—

1. A coupling pin or bolt, in combination with a spring secured at one end to said pin and at the other to a cup engaging the other end of the pin, said spring being adapted to stride the parts coupled by said pin, substantially as described.

2. The combination with a coupling-pin, of a spring secured at one end to the head of the pin, a cup secured to the other end of said spring to receive the point or free end of the pin, and a washer on the pin intermediate the axle-clip and the open end of the cup, adapting the latter to secure the pin in place and also to serve as a lubricating-cup, substantially as described.

In testimony whereof I have signed this specification in the presence of two subscribing witnesses.

AUGUST G. MAY.

Witnesses:
GEO. H. WALLENBROCK,
BENJ. F. BRUNS.